United States Patent
Wallis et al.

(10) Patent No.: US 11,346,583 B2
(45) Date of Patent: May 31, 2022

(54) CLIMATE-CONTROL SYSTEM HAVING VAPOR-INJECTION COMPRESSORS

(71) Applicant: Emerson Climate Technologies, Inc., Sidney, OH (US)

(72) Inventors: Frank S. Wallis, Sidney, OH (US); Wayne R. Warner, Grand Junction, CO (US); Russ M. Beisner, Versailles, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 16/447,468

(22) Filed: Jun. 20, 2019

(65) Prior Publication Data
US 2020/0003457 A1   Jan. 2, 2020

Related U.S. Application Data

(60) Provisional application No. 62/690,696, filed on Jun. 27, 2018.

(51) Int. Cl.
*F25B 5/02*         (2006.01)
*F25B 41/31*        (2021.01)
*F25B 41/385*       (2021.01)

(52) U.S. Cl.
CPC ............ *F25B 5/02* (2013.01); *F25B 41/31* (2021.01); *F25B 41/385* (2021.01); *F25B 2400/075* (2013.01)

(58) Field of Classification Search
CPC .......... F25B 5/02; F25B 41/31; F25B 41/385; F25B 2400/075; F25B 41/39;
(Continued)

(56) References Cited

U.S. PATENT DOCUMENTS

| 2,793,506 A | 5/1957 | Moody |
| 2,911,513 A | 11/1959 | MacCracken |

(Continued)

FOREIGN PATENT DOCUMENTS

| CH | 703290 A1 | 12/2011 |
| CN | 1385659 A | 12/2002 |

(Continued)

OTHER PUBLICATIONS

U.S. Appl. No. 16/245,641, filed Jan. 11, 2019, Kirill M. Ignatiev et al..

(Continued)

*Primary Examiner* — Ljiljana V. Ciric
(74) *Attorney, Agent, or Firm* — Harness, Dickey & Pierce, P.L.C.

(57) ABSTRACT

A climate-control system includes a first compressor, a second compressor, a first heat exchanger, a second heat exchanger, and a third heat exchanger. The first compressor includes a first inlet and a first outlet. The second compressor is in fluid communication with the first compressor and includes a second inlet (e.g., a suction inlet), a third inlet (e.g., a vapor-injection inlet), a second compression mechanism, and a second outlet. The second and third inlets are fluidly coupled with the second compression mechanism. The second compression mechanism receives working fluid from the first compressor through the third inlet and discharges working fluid through the second outlet of the second compressor. The first and second compressors are in fluid communication with the first, second, and third heat exchangers.

13 Claims, 6 Drawing Sheets

(58) Field of Classification Search
CPC ............ F25B 2400/23; F25B 2400/13; F25B 2400/072; F25B 2400/04; F25B 1/10; F25B 7/00; F25B 1/04
See application file for complete search history.

(56) References Cited

U.S. PATENT DOCUMENTS

| | | | |
|---|---|---|---|
| 3,733,845 A * | 5/1973 | Lieberman | F25B 7/00 62/335 |
| 3,782,132 A | 1/1974 | Lohoff | |
| 4,041,724 A * | 8/1977 | Gustafsson | F24D 3/18 62/175 |
| 4,119,143 A | 10/1978 | Robinson, Jr. | |
| 4,122,688 A * | 10/1978 | Mochizuki | F25B 5/02 62/196.1 |
| 4,196,595 A * | 4/1980 | Shaw | F25B 30/02 62/160 |
| 4,209,998 A | 7/1980 | Shaw | |
| 4,327,560 A | 5/1982 | Leon et al. | |
| 4,380,156 A | 4/1983 | Ecker | |
| 4,391,104 A * | 7/1983 | Wendschlag | F25B 30/02 62/79 |
| 4,532,854 A | 8/1985 | Foster | |
| 4,696,338 A | 9/1987 | Jensen et al. | |
| 4,899,555 A | 2/1990 | Shaw | |
| 4,945,733 A * | 8/1990 | LaBrecque | F25B 1/00 62/278 |
| 4,947,655 A * | 8/1990 | Shaw | F25B 5/02 62/200 |
| 5,042,268 A * | 8/1991 | LaBrecque | F25B 1/00 62/278 |
| 5,095,712 A | 3/1992 | Narreau | |
| 5,103,650 A | 4/1992 | Jaster | |
| 5,235,820 A * | 8/1993 | Radermacher | F25B 1/10 62/114 |
| 5,241,829 A * | 9/1993 | Irie | F25B 30/02 62/204 |
| 5,261,251 A | 11/1993 | Galiyano | |
| 5,347,831 A * | 9/1994 | Kitaguchi | F25B 1/00 62/510 |
| 5,383,339 A * | 1/1995 | McCloskey | F25B 40/02 62/238.5 |
| 5,400,609 A * | 3/1995 | Sjoholm | F25B 27/00 62/113 |
| 5,408,836 A * | 4/1995 | Sjoholm | F01P 3/20 62/196.1 |
| 5,410,889 A * | 5/1995 | Sjoholm | F25B 5/00 62/160 |
| 5,729,994 A | 3/1998 | Mukaiyama et al. | |
| 5,894,739 A | 4/1999 | Temos | |
| 6,053,715 A | 4/2000 | Hirano et al. | |
| 6,070,421 A | 6/2000 | Petrovich et al. | |
| 6,205,802 B1 | 3/2001 | Drucker et al. | |
| 6,220,337 B1 | 4/2001 | Chen et al. | |
| 6,231,316 B1 | 5/2001 | Wakisaka et al. | |
| 6,629,413 B1 | 10/2003 | Wendt et al. | |
| 6,758,057 B2 | 7/2004 | Vince, II et al. | |
| 7,096,929 B2 | 8/2006 | Clarksean | |
| 7,147,071 B2 | 12/2006 | Gering et al. | |
| 7,240,725 B2 | 7/2007 | Horn et al. | |
| 7,721,562 B2 | 5/2010 | Lifson et al. | |
| 7,874,499 B2 | 1/2011 | Lochtefeld | |
| 8,020,402 B2 | 9/2011 | Pham et al. | |
| 8,091,381 B2 | 1/2012 | Boiarski et al. | |
| 8,181,470 B2 | 5/2012 | Narayanamurthy et al. | |
| 8,424,326 B2 * | 4/2013 | Mitra | F25B 1/10 62/196.1 |
| 8,528,345 B2 | 9/2013 | Parsonnet et al. | |
| 8,671,703 B2 | 3/2014 | Mitra et al. | |
| 8,713,963 B2 | 5/2014 | Yanik | |
| 9,212,834 B2 | 12/2015 | Parsonnet et al. | |
| 9,353,980 B2 | 5/2016 | Ignatiev | |
| 9,441,861 B2 | 9/2016 | Diamond et al. | |
| 9,470,435 B2 | 10/2016 | Hinde et al. | |
| 9,599,377 B2 | 3/2017 | Kato | |
| 9,709,302 B2 | 7/2017 | Martin et al. | |
| 9,863,672 B2 | 1/2018 | Goenka | |
| 9,989,271 B1 | 6/2018 | Becker | |
| 10,036,580 B2 | 7/2018 | Zha et al. | |
| 10,088,202 B2 * | 10/2018 | Huff | F25B 49/005 |
| 10,465,962 B2 | 11/2019 | Ignatiev et al. | |
| 10,598,395 B2 | 3/2020 | Attari et al. | |
| 10,648,714 B2 | 5/2020 | Van Gysel | |
| 10,663,201 B2 | 5/2020 | Hayes | |
| 10,969,165 B2 * | 4/2021 | Saunders | F25B 15/008 |
| 11,014,427 B2 * | 5/2021 | Vehr | B60H 1/005 |
| 11,179,999 B2 * | 11/2021 | Mieda | B60H 1/22 |
| 11,187,447 B2 * | 11/2021 | Koike | F25B 49/02 |
| 2002/0066278 A1 * | 6/2002 | Cho | F25B 6/04 62/114 |
| 2002/0174673 A1 | 11/2002 | Wilkinson | |
| 2002/0187050 A1 | 12/2002 | Narney et al. | |
| 2004/0035122 A1 * | 2/2004 | Lifson | F25B 1/10 62/113 |
| 2004/0159119 A1 | 8/2004 | Hu | |
| 2005/0061497 A1 | 3/2005 | Amaral et al. | |
| 2005/0150248 A1 | 7/2005 | Manole | |
| 2005/0204773 A1 | 9/2005 | Imai et al. | |
| 2005/0235664 A1 | 10/2005 | Pham | |
| 2006/0010904 A1 | 1/2006 | Nieter et al. | |
| 2006/0010907 A1 * | 1/2006 | Taras | F25B 41/20 62/513 |
| 2006/0059933 A1 | 3/2006 | Axakov et al. | |
| 2008/0034760 A1 | 2/2008 | Narayanamurthy et al. | |
| 2008/0078192 A1 | 4/2008 | Ignatiev et al. | |
| 2008/0078204 A1 | 4/2008 | Ignatiev | |
| 2008/0078542 A1 | 4/2008 | Gering et al. | |
| 2008/0116289 A1 | 5/2008 | Lochtefeld | |
| 2008/0196877 A1 | 8/2008 | Zeigler et al. | |
| 2008/0245505 A1 | 10/2008 | Yamaguchi et al. | |
| 2009/0007589 A1 | 1/2009 | Takegami et al. | |
| 2009/0173336 A1 | 7/2009 | Leifer et al. | |
| 2009/0211732 A1 | 8/2009 | Goenka | |
| 2009/0235678 A1 * | 9/2009 | Taras | F25B 49/022 62/115 |
| 2009/0297377 A1 | 12/2009 | Stover et al. | |
| 2010/0071391 A1 * | 3/2010 | Lifson | F25B 9/06 62/115 |
| 2010/0077777 A1 * | 4/2010 | Lifson | F25B 9/008 62/117 |
| 2010/0083677 A1 * | 4/2010 | Lifson | F25B 1/10 62/115 |
| 2010/0083678 A1 * | 4/2010 | Lifson | F25B 1/10 62/115 |
| 2010/0115975 A1 * | 5/2010 | Mitra | F25B 1/10 62/196.1 |
| 2010/0132399 A1 * | 6/2010 | Mitra | B60H 1/3228 62/498 |
| 2010/0139298 A1 * | 6/2010 | Lifson | F04B 35/01 62/115 |
| 2010/0199694 A1 * | 8/2010 | Taras | F25B 49/027 62/117 |
| 2010/0199715 A1 * | 8/2010 | Lifson | F25B 41/20 62/510 |
| 2010/0263393 A1 | 10/2010 | Chen et al. | |
| 2010/0287934 A1 | 11/2010 | Glynn et al. | |
| 2011/0023514 A1 * | 2/2011 | Mitra | B60H 1/3228 62/222 |
| 2011/0048041 A1 | 3/2011 | Asprovski et al. | |
| 2011/0094259 A1 | 4/2011 | Lifson et al. | |
| 2011/0113804 A1 | 5/2011 | Chin et al. | |
| 2011/0135509 A1 | 6/2011 | Fields et al. | |
| 2011/0138825 A1 | 6/2011 | Chen et al. | |
| 2011/0139794 A1 | 6/2011 | Pham et al. | |
| 2011/0144944 A1 | 6/2011 | Pham | |
| 2011/0174014 A1 * | 7/2011 | Scarcella | F25B 43/006 62/510 |
| 2011/0232890 A9 | 9/2011 | Gering et al. | |
| 2012/0011866 A1 | 1/2012 | Scarcella et al. | |
| 2012/0117988 A1 | 5/2012 | Mitra et al. | |
| 2012/0167602 A1 | 7/2012 | Taras et al. | |

(56) References Cited

U.S. PATENT DOCUMENTS

| | | | |
|---|---|---|---|
| 2012/0192579 A1* | 8/2012 | Huff | B60H 1/3228 62/115 |
| 2012/0227427 A1 | 9/2012 | Liu et al. | |
| 2012/0285185 A1 | 11/2012 | Huff | |
| 2012/0318008 A1 | 12/2012 | Liu et al. | |
| 2013/0031934 A1 | 2/2013 | Huff et al. | |
| 2013/0075076 A1 | 3/2013 | Agostini et al. | |
| 2013/0263623 A1 | 10/2013 | Lee et al. | |
| 2013/0298593 A1 | 11/2013 | Christensen | |
| 2014/0053585 A1 | 2/2014 | Huff | |
| 2014/0151015 A1* | 6/2014 | Sun | F25B 49/02 165/253 |
| 2014/0190195 A1 | 7/2014 | Muscatell | |
| 2014/0216102 A1 | 8/2014 | Ignatiev et al. | |
| 2014/0326018 A1 | 11/2014 | Ignatiev | |
| 2015/0176872 A1 | 6/2015 | Goenka | |
| 2015/0330673 A1 | 11/2015 | Honda et al. | |
| 2016/0010902 A1 | 1/2016 | Andres | |
| 2016/0231035 A1 | 8/2016 | Lee et al. | |
| 2016/0313057 A1 | 10/2016 | Roberts et al. | |
| 2017/0058773 A1 | 3/2017 | Vaisman | |
| 2017/0074567 A1 | 3/2017 | Ali et al. | |
| 2017/0138643 A1* | 5/2017 | Ignatiev | F25B 41/20 |
| 2017/0191727 A1* | 7/2017 | Chae | F25B 5/02 |
| 2017/0198946 A1 | 7/2017 | Takenaka et al. | |
| 2017/0198950 A1* | 7/2017 | Bresson | F25B 41/20 |
| 2017/0219264 A1* | 8/2017 | Song | F25B 47/022 |
| 2017/0254569 A1* | 9/2017 | Kuroda | F25B 1/10 |
| 2017/0350658 A1 | 12/2017 | Kerth et al. | |
| 2017/0370639 A1 | 12/2017 | Bardon et al. | |
| 2018/0106517 A1* | 4/2018 | Baltus | B01D 53/265 |
| 2018/0147916 A1 | 5/2018 | Kolda et al. | |
| 2018/0209689 A1 | 7/2018 | Ipposhi et al. | |
| 2018/0217019 A1* | 8/2018 | Furumoto | F25B 7/00 |
| 2018/0299171 A1 | 10/2018 | Olsen et al. | |
| 2018/0347861 A1* | 12/2018 | Wang | F25B 49/022 |
| 2019/0011152 A1* | 1/2019 | Kniffler | F25B 39/00 |
| 2019/0041102 A1 | 2/2019 | Zha et al. | |
| 2019/0128568 A1 | 5/2019 | Scarcella et al. | |
| 2019/0186801 A1 | 6/2019 | Kopko et al. | |
| 2019/0242657 A1 | 8/2019 | Ignatiev et al. | |
| 2019/0264933 A1 | 8/2019 | Ignatiev et al. | |
| 2019/0271491 A1 | 9/2019 | Sishtla et al. | |
| 2019/0353361 A1 | 11/2019 | Attari et al. | |
| 2019/0353409 A1 | 11/2019 | Warner et al. | |
| 2019/0360703 A1 | 11/2019 | Franck | |
| 2020/0124330 A1 | 4/2020 | Hayes | |
| 2020/0333053 A1* | 10/2020 | Hellmann | F25B 41/20 |
| 2021/0048203 A1 | 2/2021 | Melink et al. | |
| 2021/0364201 A1* | 11/2021 | Tanaka | F25B 49/02 |

FOREIGN PATENT DOCUMENTS

| | | |
|---|---|---|
| CN | 1108501 C | 5/2003 |
| CN | 101517323 A | 8/2009 |
| CN | 101688697 A | 3/2010 |
| CN | 101688698 A | 3/2010 |
| CN | 101688725 A | 3/2010 |
| CN | 203364496 U | 12/2013 |
| CN | 203442998 U | 2/2014 |
| CN | 104471334 A | 3/2015 |
| CN | 105004087 A | 10/2015 |
| CN | 105190197 A | 12/2015 |
| DE | 102008049954 A1 | 4/2010 |
| DE | 102010037474 A1 | 1/2012 |
| EP | 0402131 A2 | 12/1990 |
| EP | 0402131 B1 | 10/1993 |
| EP | 1607695 A2 | 12/2005 |
| FR | 3020130 A1 | 10/2015 |
| GB | 2017890 A | 10/1979 |
| GB | 2220256 A | 1/1990 |
| JP | H09310894 A | 12/1997 |
| JP | 2003050059 A | 2/2003 |
| JP | 2010216783 A | 9/2010 |
| JP | 2012167869 A | 9/2012 |
| KR | 101722384 B1 | 4/2017 |
| WO | WO-2006015629 A1 | 2/2006 |
| WO | WO-2007111594 A1 | 10/2007 |
| WO | WO-2008079128 A1 | 7/2008 |
| WO | WO-2008140454 A1 | 11/2008 |
| WO | WO-2009041959 A1 | 4/2009 |
| WO | WO-2009098899 A1 | 8/2009 |
| WO | WO-2013016404 A1 | 1/2013 |
| WO | WO-2016196109 A1 | 12/2016 |
| WO | WO-2017029819 A1 | 2/2017 |

OTHER PUBLICATIONS

U.S. Appl. No. 16/280,758, filed Feb. 20, 2019, Kirill M. Ignatiev et al..
U.S. Appl. No. 16/412,838, filed May 15, 2019, Babak Attari et al..
Clarksean, Randy, "A Phase Change Material Slurry System to Decrease Peak Air Conditioning Loads: Independent Assessment and Final EISG Report." Public Interest Energy Research, California Energy Commission, 2006 (81 pages).
International Search Report regarding International Application No. PCT/US2014/036592, dated Sep. 1, 2014.
Written Opinion of the International Searching Authority regarding International Application No. PCT/US2014/036592, dated Sep. 1, 2014.
Office Action regarding U.S. Appl. No. 14/267,224, dated Nov. 24, 2015.
Notice of Allowance regarding U.S. Appl. No. 14/267,224, dated Mar. 16, 2016.
Office Action regarding Chinese Patent Application No. 201480024924.3, dated Sep. 20, 2016. Translation provided by Unitalen Attorneys at Law.
Search Report regarding European Patent Application No. 14791184.6, dated Nov. 14, 2016.
International Search Report regarding International Application No. PCT/US2016/060990, dated Feb. 7, 2017.
Written Opinion of the International Searching Authority regarding International Application No. PCT/US2016/060990, dated Feb. 7, 2017.
Office Action regarding Chinese Patent Application No. 201480024924.3, dated Jun. 19, 2017. Translation provided by Unitalen Attorneys at Law.
Restriction Requirement regarding U.S. Appl. No. 15/339,012, dated Sep. 28, 2018.
Office Action regarding U.S. Appl. No. 15/339,012, dated Jan. 9, 2019.
International Search Report regarding International Application No. PCT/US2019/016518, dated May 21, 2019.
Written Opinion of the International Searching Authority regarding International Application No. PCT/US2019/016518, dated May 21, 2019.
International Search Report regarding International Application No. PCT/US2019/019216, dated Jun. 3, 2019.
Written Opinion of the International Searching Authority regarding International Application No. PCT/US2019/019216, dated Jun. 3, 2019.
Office Action regarding U.S. Appl. No. 15/339,012, dated Jun. 26, 2019.
Search Report regarding European Patent Application No. 16866861.4, dated Aug. 22, 2019.
International Search Report regarding International Application No. PCT/US2019/032478, dated Sep. 4, 2019.
Written Opinion of the International Searching Authority regarding International Application No. PCT/US2019/032478, dated Sep. 4, 2019.
Notice of Allowance regarding U.S. Appl. No. 15/339,012, dated Sep. 5, 2019.
Office Action regarding U.S. Appl. No. 16/245,641, dated Aug. 19, 2020.
Office Action regarding European Patent Application No. 14791184.6, dated Sep. 29, 2020.

(56) References Cited

OTHER PUBLICATIONS

Office Action regarding U.S. Appl. No. 16/245,641, dated May 12, 2020.
Office Action regarding Chinese Patent Application No. 201680066979.X, dated May 29, 2020.
Office Action regarding Chinese Patent Application No. 201680066979.X, dated Oct. 18, 2019. Translation provided by Unitalen Attorneys at Law.
International Search Report regarding International Application No. PCT/US2019/039304, dated Oct. 22, 2019.
Written Opinion of the International Searching Authority regarding International Application No. PCT/US2019/039304, dated Oct. 22, 2019.
Notice of Allowance regarding U.S. Appl. No. 16/412,838, dated Dec. 13, 2019.
Office Action regarding U.S. Appl. No. 16/245,641, dated Feb. 4, 2021.
Office Action regarding U.S. Appl. No. 16/280,758, dated Mar. 4, 2021.
Office Action regarding Chinese Patent Application No. 201980016759.X, dated Apr. 2, 2021. Translation provided by Unitalen Attorneys at Law.
Non-Final Office Action regarding U.S. Appl. No. 16/245,641 dated Aug. 18, 2021.
Extended European Search Report regarding Application No. 19748107.0 dated Oct. 11, 2021.
Extended European Search Report regarding Application No. 19756778.7 dated Oct. 28, 2021.
First Chinese Office Action regarding Application No. 201980042749.3 dated Oct. 8, 2021. English translation provided by Unitalen Attorneys at Law.

* cited by examiner

CLIMATE-CONTROL SYSTEM HAVING VAPOR-INJECTION COMPRESSORS

CROSS-REFERENCE TO RELATED APPLICATIONS

This application claims the benefit of U.S. Provisional Application No. 62/690,696, filed on Jun. 27, 2018. The entire disclosure of the above application is incorporated herein by reference.

FIELD

The present disclosure relates to a climate-control system having vapor-injection compressors.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, one or more indoor heat exchangers, one or more expansion devices, and one or more compressors circulating a working fluid (e.g., refrigerant or carbon dioxide) through the fluid circuit. Efficient and reliable operation of the climate-control system is desirable to ensure that the climate-control system is capable of effectively and efficiently providing a cooling and/or heating effect on demand.

SUMMARY

This section provides a general summary of the disclosure, and is not a comprehensive disclosure of its full scope or all of its features.

In one form, a climate-control system of the present disclosure may include first and second compressors. The first compressor may have a first inlet and a first outlet. The second compressor may be in fluid communication with the first compressor and may have second and third inlets, a second compression mechanism and a second outlet. The second and third inlets may be fluidly coupled to the second compression mechanism. The second compression mechanism may receive working fluid from the first compressor through the third inlet and may discharge working fluid through the second outlet of the second compressor.

In some configurations of the climate-control system of the above paragraph, a first heat exchanger is in fluid communication with the second compressor and receives working fluid from the second compressor.

In some configurations of the climate-control system of any one or more of the above paragraphs, a second heat exchanger is in fluid communication with the first heat exchanger and includes a fourth inlet and third and fourth outlets. The fourth inlet receives working fluid from the first heat exchanger and the third outlet provides working fluid to the first inlet.

In some configurations of the climate-control system of any one or more of the above paragraphs, a first expansion device is disposed between the first heat exchanger and the second heat exchanger.

In some configurations of the climate-control system of any one or more of the above paragraphs, the fourth outlet of the second heat exchanger provides working fluid to the second inlet of the second compressor.

In some configurations of the climate-control system of any one or more of the above paragraphs, a third heat exchanger is disposed between the first and second compressors and includes a fifth inlet, a fifth outlet providing working fluid to the second inlet of the second compressor, and a sixth outlet providing working fluid to the third inlet of the second compressor.

In some configurations of the climate-control system of any one or more of the above paragraphs, a first fluid passageway extends from the fourth outlet of the second heat exchanger through the third heat exchanger and provides working fluid from the fourth outlet of the second heat exchanger to the second inlet of the second compressor.

In some configurations of the climate-control system of any one or more of the above paragraphs, a second expansion device is disposed along the first fluid passageway at a location upstream of the third heat exchanger and a third expansion device disposed along the first fluid passageway at a location downstream of the third heat exchanger.

In some configurations of the climate-control system of any one or more of the above paragraphs, a second fluid passageway extends from a liquid conduit fluidly coupled to the third outlet of the second heat exchanger to the first fluid passageway.

In some configurations of the climate-control system of any one or more of the above paragraphs, the second fluid passageway includes a fourth heat exchanger and a fourth expansion device.

In some configurations of the climate-control system of any one or more of the above paragraphs, a third fluid passageway extends from the liquid conduit fluidly coupled to the third outlet of the second heat exchanger and provides working fluid from the liquid conduit to the first inlet of the first compressor.

In some configurations of the climate-control system of any one or more of the above paragraphs, the third fluid passageway includes a fifth heat exchanger and a fifth expansion device.

In some configurations of the climate-control system of any one or more of the above paragraphs, the fourth heat exchanger is a medium-temperature heat exchanger and the fifth heat exchanger is a low-temperature heat exchanger.

In some configurations of the climate-control system of any one or more of the above paragraphs, the second heat exchanger is a flash tank. The third outlet is a liquid outlet and the fourth outlet is a vapor outlet.

In some configurations of the climate-control system of any one or more of the above paragraphs, a bypass passageway extends from the first fluid passageway at a location upstream of the third heat exchanger to the first fluid passageway at a location downstream of the third heat exchanger.

In some configurations of the climate-control system of any one or more of the above paragraphs, a first fluid passageway is in fluid communication with the first outlet of the first compressor and provides working fluid from the first outlet of the first compressor to the third inlet of the second compressor.

In some configurations of the climate-control system of any one or more of the above paragraphs, a first 3-way valve is disposed along the first fluid passageway. The first 3-way valve includes a fourth inlet and third and fourth outlets.

In some configurations of the climate-control system of any one or more of the above paragraphs, the second inlet of the second compressor is in fluid communication with the third outlet of the first 3-way valve and receives working fluid from the third outlet of the first 3-way valve.

In some configurations of the climate-control system of any one or more of the above paragraphs, the fourth outlet of the first 3-way valve provides working fluid to one of the third inlet of the second compressor and the first heat exchanger.

In some configurations of the climate-control system of any one or more of the above paragraphs, a second 3-way valve is disposed along the first fluid passageway at a location downstream of the first 3-way valve. The second 3-way valve includes a fifth inlet and fifth and sixth outlets.

In some configurations of the climate-control system of any one or more of the above paragraphs, a second fluid passageway receives working fluid from the second outlet of the second compressor and includes the first heat exchanger. A third fluid passageway extends from the fifth outlet of the second 3-way valve to the second fluid passageway.

In some configurations of the climate-control system of any one or more of the above paragraphs, the fifth inlet of the second 3-way valve is in fluid communication with the fourth outlet of the first 3-way valve and receives working fluid from the fourth outlet of the first 3-way valve.

In some configurations of the climate-control system of any one or more of the above paragraphs, the sixth outlet of the second 3-way valve is in fluid communication with the third inlet of the second compressor and provides working fluid to the third inlet of the second compressor.

In some configurations of the climate-control system of any one or more of the above paragraphs, a first heat exchanger is in fluid communication with the second compressor and receives working fluid from the second compressor.

In some configurations of the climate-control system of any one or more of the above paragraphs, a second heat exchanger is in fluid communication with the first heat exchanger and includes a fourth inlet and third and fourth outlets. The fourth inlet receives working fluid from the first heat exchanger. The third outlet provides working fluid to the first inlet.

In some configurations of the climate-control system of any one or more of the above paragraphs, the first compressor includes a fifth inlet and a first compression mechanism. The fifth inlet of the first compressor is fluidly coupled the first compression mechanism and the first compression mechanism receives working fluid from the second heat exchanger through the fifth inlet of the first compressor.

In some configurations of the climate-control system of any one or more of the above paragraphs, a first fluid passageway extends from the fourth outlet of the second heat exchanger and provides working fluid from the fourth outlet of the second heat exchanger to the fifth inlet of the first compressor. A second fluid passageway extends from a liquid conduit fluidly coupled to the third outlet of the second heat exchanger and provides working fluid from the liquid conduit to the second inlet of the second compressor.

In some configurations of the climate-control system of any one or more of the above paragraphs, the first fluid passageway includes a second expansion device.

In some configurations of the climate-control system of any one or more of the above paragraphs, the second fluid passageway includes a third heat exchanger and a third expansion device.

In some configurations of the climate-control system of any one or more of the above paragraphs, a third fluid passageway extends from the liquid conduit fluidly coupled to the third outlet of the second heat exchanger and provides working fluid from the liquid conduit to the first inlet of the first compressor. A fourth fluid passageway is in fluid communication with the first outlet of the first compressor and provides working fluid to the third inlet of the second compressor.

In some configurations of the climate-control system of any one or more of the above paragraphs, the third fluid passageway includes a fourth heat exchanger and a fourth expansion device.

In some configurations of the climate-control system of any one or more of the above paragraphs, the third heat exchanger is a medium-temperature heat exchanger and the fourth heat exchanger is a low-temperature heat exchanger.

In another form, a climate-control system of the present disclosure may include a first working-fluid circuit, a second working-fluid circuit and a first heat exchanger. The first working-fluid circuit may include a first compressor and a second heat exchanger. The first compressor may have first and second inlets, a compression mechanism and an outlet. The first and second inlets may be fluidly coupled to the compression mechanism. The second heat exchanger may receive a first working fluid from the outlet of the first compressor. The second working-fluid circuit may include a second compressor and a third heat exchanger. The third heat exchanger may be in fluid communication with the second compressor. The first heat exchanger may be thermally coupled with the first working-fluid circuit and the second working-fluid circuit. The compression mechanism may receive a first working-fluid circuit exiting the first heat exchanger through the second inlet.

In some configurations, the first working-fluid circuit and the second working-fluid circuit are fluidly isolated from each other.

In some configurations of the climate-control system of any one or more of the above paragraphs, the first heat exchanger includes first and second conduits. The first conduit is in fluid communication with the first working-fluid circuit and the second conduit is in fluid communication with the second working-fluid circuit.

In some configurations of the climate-control system of any one or more of the above paragraphs, the first working-fluid circuit includes a first expansion device disposed between the second heat exchanger and the first conduit of the first heat exchanger.

In some configurations of the climate-control system of any one or more of the above paragraphs, the first working-fluid circuit includes a first fluid passageway that is in fluid communication with the outlet of the first compressor and provides working fluid to the second inlet of the first compressor.

In some configurations of the climate-control system of any one or more of the above paragraphs, the first working-fluid circuit includes a second fluid passageway that extends from the first fluid passageway at a location between the second heat exchanger and the first expansion device and to the first inlet of the first compressor.

In some configurations of the climate-control system of any one or more of the above paragraphs, the second fluid passageway includes a fourth heat exchanger and a second expansion device.

In some configurations of the climate-control system of any one or more of the above paragraphs, a third expansion device is disposed between the second conduit of the first heat exchanger and the third heat exchanger.

In some configurations of the climate-control system of any one or more of the above paragraphs, the third heat exchanger is a low-temperature heat exchanger and the fourth heat exchanger is a medium-temperature heat exchanger.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
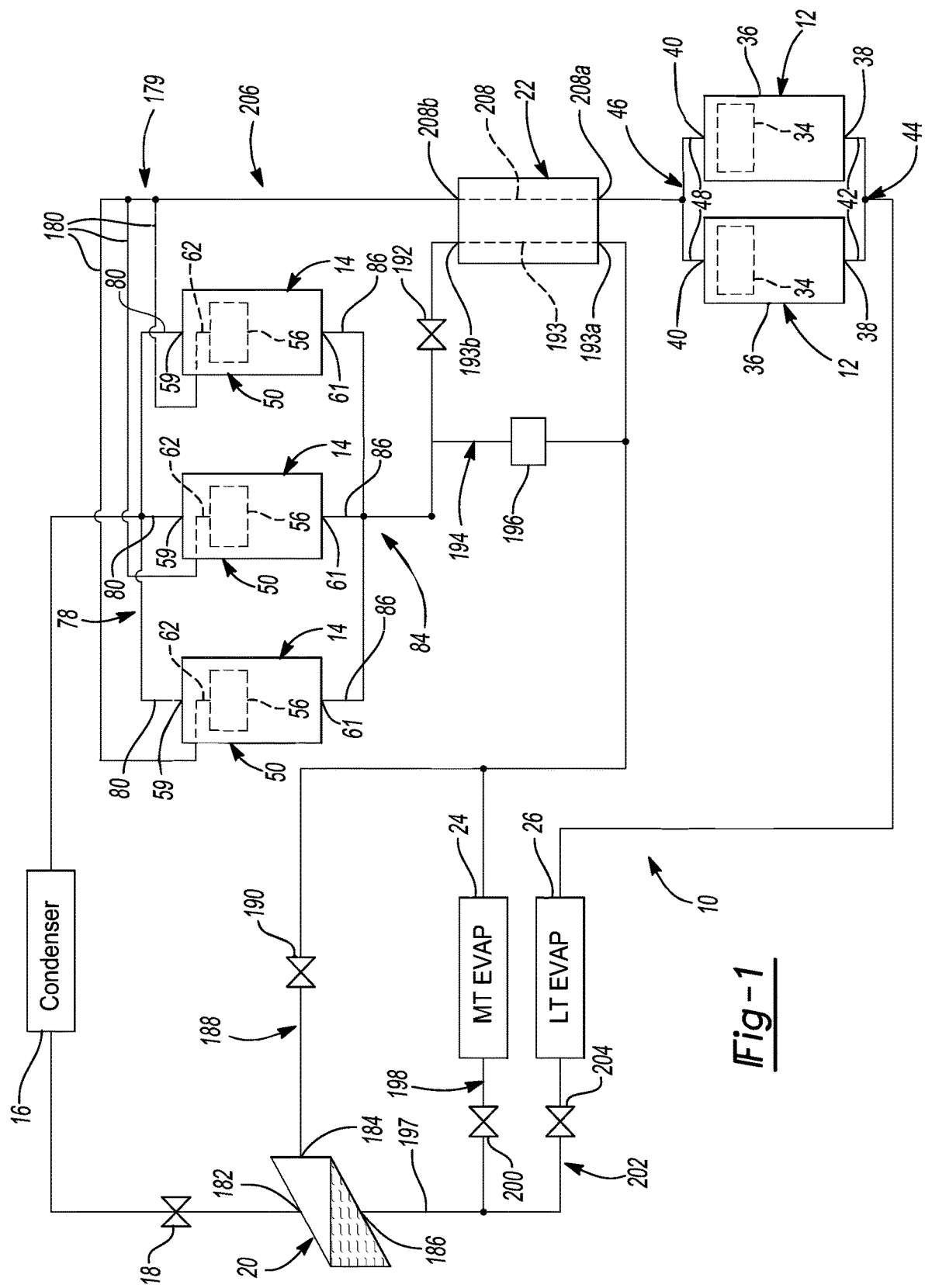
FIG. 1 is a schematic representation of a climate-control system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a climate-control system 10 is provided that may include a fluid-circuit having one or more first compressors 12, one or more second compressors 14, a first heat exchanger 16 (an outdoor heat exchanger such as a condenser or gas cooler, for example), a first expansion device 18, a flash tank (a second heat exchanger) 20, a third heat exchanger 22, a fourth heat exchanger 24 (an indoor heat exchanger such as a medium-temperature evaporator, for example) and a fifth heat exchanger 26 (an indoor heat exchanger such as a low-temperature evaporator, for example). The first compressors 12 and/or the second compressors 14 may pump working fluid (e.g., refrigerant, carbon dioxide, etc.) through the circuit.

Each first compressor 12 may be a low-side compressor (i.e., a compressor in which the motor assembly is disposed within a suction-pressure chamber within the shell), for example, and may be any suitable type of compressor such as a scroll, rotary, reciprocating or screw compressor, for example. Each first compressor 12 includes a compression mechanism 34 disposed within a shell 36 having an inlet 38 (e.g., a first inlet or first inlet fitting) and an outlet 40 (e.g., a first outlet or outlet fitting). The inlet 38 may provide fluid to a suction inlet (not shown) of the compression mechanism 34 (e.g., a radially outermost pocket of a scroll compression mechanism). Suction lines 42 may be fluidly coupled to a first header 44 and corresponding inlets 38 of the first compressors 12. In this manner, working fluid exiting the fifth heat exchanger 26 may flow into the first header 44 where it is distributed to the suction lines 42 and the inlets 38 of the first compressors 12 to be compressed by the compression mechanisms 34 of the first compressors 12. After the working fluid is compressed by the compression mechanisms 34 of the first compressors 12, the working fluid can be discharged from the first compressors 12 through the outlets 40 to a second header 46 via discharge lines 48.

In some configurations, each first compressor 12 could be a high-side compressor (i.e., a compressor in which the motor assembly is disposed within a discharge-pressure chamber within the shell). In some configurations, each of the first compressors 12 may have different capacities than one another or than the second compressors 14. In some configurations, one or more of the first compressors 12 or one or more of the second compressors 14 may include a fixed-speed or variable-speed motor.

Figure 2:
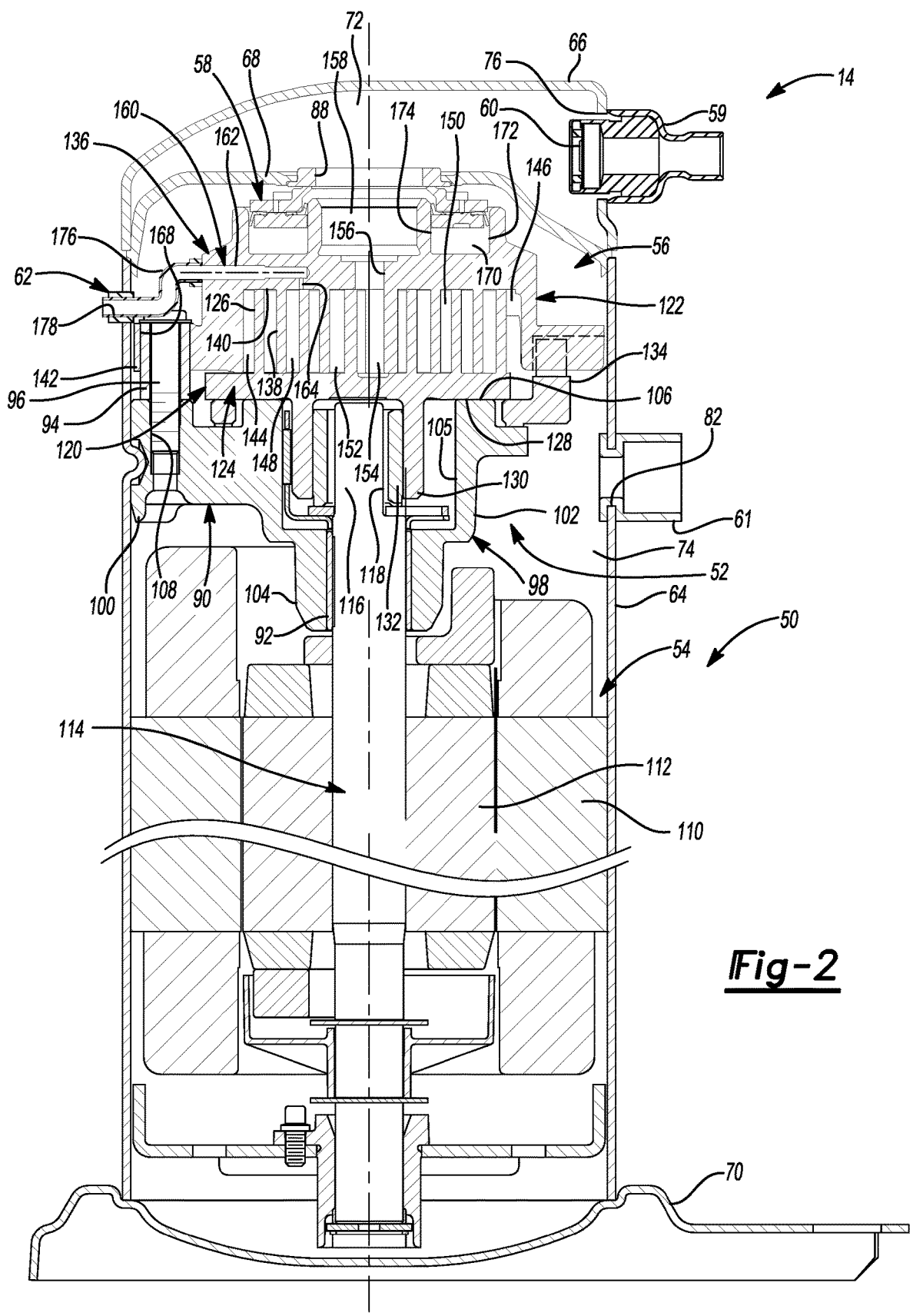
FIG. 2 is a cross-sectional view of a compressor of the climate-control system of FIG. 1.

Referring now to FIG. 2, each second compressor 14 may be a low-side scroll compressor including a hermetic shell assembly 50, a main bearing housing assembly 52, a motor assembly 54, a compression mechanism 56, a seal assembly 58, a discharge fitting (a second outlet) 59, a discharge valve assembly 60, a suction gas inlet fitting (a second inlet) 61 and an S-shaped vapor-injection conduit 62 (e.g., a third inlet). The shell assembly 50 may house the main bearing housing assembly 52, the motor assembly 54, the compression mechanism 56 and the seal assembly 58, and may at least partially house the vapor-injection conduit 62.

The shell assembly 50 may generally form a compressor housing and may include a cylindrical shell 64, an end cap 66 at the upper end thereof, a transversely extending partition 68 and a base 70 at a lower end thereof. The end cap 66 and the partition 68 may generally define a discharge chamber 72, while the cylindrical shell 64, the partition 68 and the base 70 may generally define a suction chamber 74. The discharge fitting 59 may be attached to the shell assembly 50 at an opening 76 in the end cap 66 and may be in fluid communication with a third header 78 via a discharge line 80. The discharge valve assembly 60 may be located within the discharge fitting 59 and may generally prevent a reverse flow condition. The suction gas inlet fitting 61 may be attached to the shell assembly 50 at an opening 82 such that the suction gas inlet fitting 61 is in fluid communication with the suction chamber 74 and a fourth header 84 via a suction line 86. The partition 68 may include a discharge passage 88 therethrough that provides communication between the compression mechanism 56 and the discharge chamber 72.

The main bearing housing assembly 52 may be affixed to the shell at a plurality of points in any desirable manner, such as staking, for example. The main bearing housing assembly 52 may include a main bearing housing 90, a first bearing 92 disposed therein, bushings 94 and fasteners 96. The main bearing housing 90 may include a central body portion 98 having a series of arms 100 that extend radially outwardly therefrom. The central body portion 98 may include first and second portions 102 and 104 having an opening 105 extending therethrough. The second portion 104 may house the first bearing 92 therein. The first portion 102 may define an annular flat thrust bearing surface 106 on an axial end surface thereof. Each arm 100 may include an aperture 108 extending therethrough that receives a respective fastener 96.

The motor assembly 54 may generally include a motor stator 110, a rotor 112, and a drive shaft 114. The motor stator 110 may be press-fit into the shell 64. The drive shaft 114 may be rotatably driven by the rotor 112. The rotor 112 may be press-fit onto the drive shaft 114. The drive shaft 114 may include an eccentric crank pin 116 having a flat 118 thereon.

The compression mechanism 56 may generally include an orbiting scroll 120 and a non-orbiting scroll 122. The orbiting scroll 120 may include an endplate 124 having a spiral vane or wrap 126 on the upper surface thereof and an annular flat thrust surface 128 on the lower surface. The thrust surface 128 may interface with the annular flat thrust bearing surface 106 on the main bearing housing 90. A cylindrical hub 130 may project downwardly from the thrust surface 128 and may have a drive bushing 132 rotatably disposed therein. The drive bushing 132 may include an inner bore in which the crank pin 116 is drivingly disposed. The crank pin flat 118 may drivingly engage a flat surface of the inner bore of the drive bushing 132 to provide a radially compliant driving arrangement. An Oldham coupling 134 may be engaged with the orbiting and non-orbiting scrolls 120, 122 to prevent relative rotation therebetween.

The non-orbiting scroll 122 may include an endplate 136 having a spiral wrap 138 on a lower surface 140 thereof and a series of radially outwardly extending flanged portions 142. The spiral wrap 138 may form a meshing engagement with the wrap 126 of the orbiting scroll 120, thereby creating compression pockets, including an inlet pocket 144, intermediate pockets 146, 148, 150, 152, and an outlet pocket 154. The non-orbiting scroll 122 may be axially displaceable relative to the main bearing housing assembly 52, the shell assembly 50, and the orbiting scroll 120. The non-orbiting scroll 122 may include a discharge passage 156 in communication with the outlet pocket 154 and an upwardly open recess 158. The upwardly open recess 158 may be in fluid communication with the discharge chamber 72 via the discharge passage 88 in the partition 68.

The endplate 136 may include an injection passage 160 formed therein. The injection passage 160 may be in fluid communication with the vapor-injection conduit 62 and with one or more of the intermediate pockets 146, 148, 150, 152 and may include a radially extending portion 162 and an axially extending portion 164. The injection passage 160 may allow working fluid from the vapor-injection conduit 62 to flow into the one or more of the intermediate pockets 146, 148, 150, 152.

The flanged portions 142 may include openings 168 therethrough. Each opening 168 may receive a respective bushing 94 therein. Each bushing 94 may receive a respective fastener 96. The respective fastener 96 may be engaged with the main bearing housing 90 to prevent rotation of the non-orbiting scroll 122 relative to the main bearing housing assembly 52. The non-orbiting scroll 122 may include an annular recess 170 in the upper surface thereof defined by parallel and coaxial inner and outer sidewalls 172, 174.

The seal assembly 58 may be located within the annular recess 170. In this way, the seal assembly 58 may be axially displaceable within the annular recess 170 relative to the shell assembly 50 and/or the non-orbiting scroll 122 to provide for axial displacement of the non-orbiting scroll 122 while maintaining a sealed engagement with the partition 68 to isolate the discharge chamber 72 from the suction chamber 74. More specifically, in some configurations, pressure within the annular recess 170 may urge the seal assembly 58 into engagement with the partition 68, and the spiral wrap 138 of the non-orbiting scroll 122 into engagement with the endplate 124 of the orbiting scroll 120, during normal compressor operation.

The vapor-injection conduit 62 may be at least partially disposed in the shell 64 and may be attached to the shell 64 at an opening thereof. The vapor-injection conduit 62 may include a first end 176 in fluid communication with the injection passage 160 and a second end 178 attached to the shell 64 and in fluid communication with a fifth header 179 (via a vapor inlet line 180).

While each second compressor 14 is described above as a low-side scroll compressor (i.e., a compressor in which the motor assembly is disposed within a suction-pressure chamber within the shell), in some configurations, each second compressor 14 could be a high-side compressor (i.e., a compressor in which the motor assembly is disposed within a discharge-pressure chamber within the shell). For example, each second compressor 14 could be a high-side or low-side compressor and could be a rotary, reciprocating, or screw compressor, or any other suitable type of compressor. It is understood that, in some configurations, each first compressor 12 may be similar or identical to each second compressor 14.

Referring again to FIG. 1, the first heat exchanger 16 may be in fluid communication with the second compressors 14 via the third header 78. That is, the third header 78 may receive the compressed working fluid from the discharge lines 80 and the discharge fittings 59 of the second compressors 14 and may direct the compressed working fluid to the first heat exchanger 16. The first heat exchanger 16 may transfer heat from the compressed working fluid to ambient air that may be forced over the first heat exchanger 16 by a fan (not shown). In some configurations, the first heat exchanger 16 may transfer heat from the compressed working fluid to a stream of liquid such as water, for example. From the first heat exchanger 16, the working fluid may flow through the first expansion device 18 (e.g., an expansion valve or capillary tube), thereby lowering the temperature and pressure of the working fluid. From the first expansion device 18, the working fluid may flow into an inlet (a fourth inlet) 182 of the flash tank 20.

In the flash tank 20, liquid working fluid is separated from vapor working fluid. Vapor working fluid may exit the flash tank 20 through a vapor outlet (a fourth outlet) 184. Liquid working fluid may exit the flash tank 20 through a liquid outlet (a third outlet) 186. From the vapor outlet 184, the vapor working fluid flows into a first fluid passageway 188 extending from the vapor outlet 184 through the third heat exchanger 22 and to the fourth header 84. The first fluid passageway 188 includes second and third expansion devices 190, 192 and a conduit 193 of the third heat exchanger 22. The second expansion device 190 (e.g., an expansion valve or capillary tube) may be disposed along the first fluid passageway 188 upstream of the third heat exchanger 22 and the third expansion device 192 (e.g., an expansion valve or capillary tube) may be disposed along the first fluid passageway 188 downstream of the third heat exchanger 22.

Vapor working fluid in the first fluid passageway 188 flows through the second expansion device 190 where its temperature and pressure is lowered. The vapor working fluid then flows through the conduit 193 of the third heat exchanger 22 and the third expansion device 192 where its temperature and pressure is lowered. From the third expansion device 192, the vapor working fluid may flow into the fourth header 84 where it is distributed to the suction lines 86 and the suction gas inlet fittings 61 of the second compressors 14 to be compressed by the compression mechanisms 56 of the second compressors 14.

In some configurations, a bypass passageway 194 may extend from the first fluid passageway 188 at a location upstream of the third heat exchanger 22 to the first fluid passageway 188 at a location downstream of the third heat exchanger 22 (i.e., bypassing the third heat exchanger 22). A bypass valve 196 may be disposed along the bypass passageway 194 and may be movable between open and closed positions. In the open position, the bypass valve 196 may allow fluid to flow from the first fluid passageway 188 upstream of the third heat exchanger 22 to the second compressors 14 (i.e., bypassing the third heat exchanger 22 and the third expansion device 192). It will be appreciated that the bypass valve 196 could be a solenoid valve, a mechanical valve actuated by fluid-pressure differentials, or an electronic expansion valve, for example, or any other type of valve.

From the liquid outlet 186, the working fluid may flow into a liquid conduit 197. A first portion of the working fluid in the liquid conduit 197 flows into a second fluid passageway 198 extending from the liquid conduit 197 to the first fluid passageway 188 at a location between the second expansion device 190 and the conduit 193 of the third heat exchanger 22. The second fluid passageway 198 includes a fourth expansion 200 and the fourth heat exchanger 24. The working fluid in the second fluid passageway 198 flows through the fourth expansion device 200 where its temperature and pressure is lowered. In the fourth heat exchanger 24, the first portion of the working fluid may absorb heat from a first space to be cooled (e.g., an interior of a refrigerator, a refrigerated display case, or a cooler). From the fourth heat exchanger 24, the working fluid flows to the first fluid passageway 188 where it is mixed with the vapor working fluid prior to the working fluid entering the conduit 193 of the third heat exchanger 22.

A second portion of the working fluid in the liquid conduit 197 flows into a third fluid passageway 202 extending from the liquid conduit 197 to the first header 44. The third fluid passageway 202 includes a fifth expansion device 204 and the fifth heat exchanger 26. The working fluid in the third fluid passageway 202 flows through the fifth expansion device 204 where its temperature and pressure is lowered. In the fifth heat exchanger 26, the working fluid may absorb heat from a second space to be cooled (e.g., freezer or a frozen food display case). In some configurations, the working fluid in the fourth heat exchanger 24 of the second fluid passageway 198 and the working fluid in the fifth heat exchanger 26 of the third fluid passageway 202 may absorb heat from the same space (e.g., the fourth heat exchanger 24 of the second fluid passageway 198 and the fifth heat exchanger 26 of the third fluid passageway 202 may operate at different times to switch the space between a freezer and a cooler, for example). From the fifth heat exchanger 26, the working fluid may flow into the first header 44 where it is distributed to the suction lines 42 and the inlets 38 of the first compressors 12 to be compressed by the compression mechanisms 34 of the first compressors 12.

After the working fluid is compressed by the compression mechanisms 34 of the first compressors 12, the compressed working fluid can be discharged from the first compressors 12 to a fourth fluid passageway 206 (via the discharge lines 48 and the second header 46). The fourth fluid passageway 206 may extend from the second header 46 through the third heat exchanger 22 to the fifth header 179. The compressed working fluid flowing through a conduit 208 of the third heat exchanger 22 absorbs heat from the working fluid in the conduit 193. From the fifth header 179, the working fluid is distributed to the vapor inlet lines 180 and into the intermediate pockets 146, 148, 150, 152 of the compression mechanisms 56 of the second compressors 14 (via the vapor-injection conduits 62). The conduit 193 (a first conduit of the third heat exchanger 22) may define a fifth inlet 193a and a fifth outlet 193b of the third heat exchanger 22. The conduit 208 (a second conduit of the third heat exchanger 22) may define a sixth inlet 208a and a sixth outlet 208b of the third heat exchanger 22.

Figure 3:
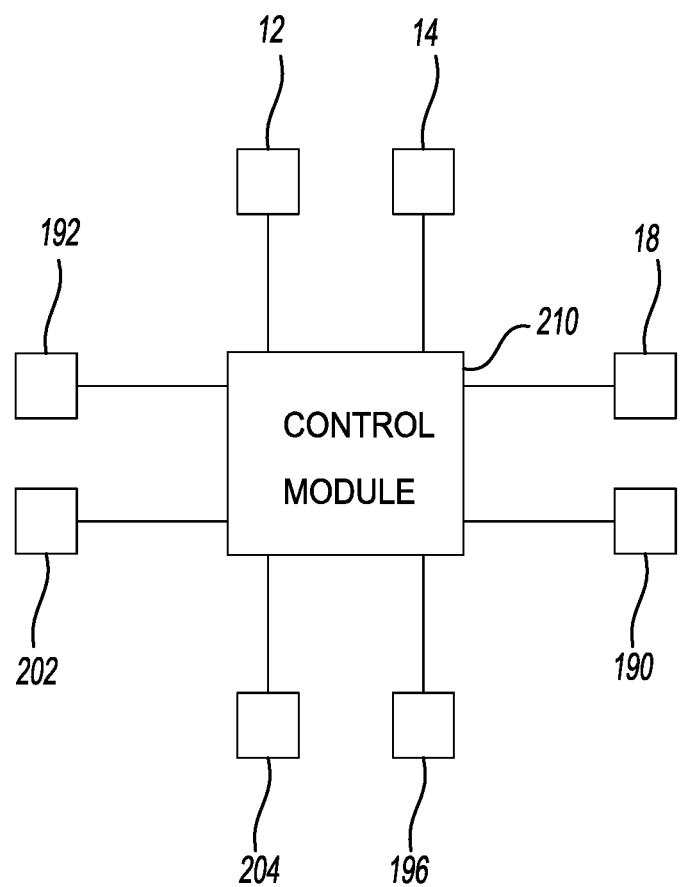
FIG. 3 is a block diagram illustrating communication between a control module and components of the climate-control system of FIG. 1.

As shown in FIG. 3, a control module 210 may be in communication with the first compressors 12, the second compressors 14, the first, second, third, fourth and fifth expansion devices, 18, 190, 192, 200, 204 and the bypass valve 196. The control module 210 may control operation of the first compressors 12, the second compressors 14, the first, second, third, fourth and fifth expansion devices, 19, 190, 192, 200, 204 and the bypass valve 196 based at least partially on one or more sensors (pressure and/or temperature sensors) positioned within and/or attached to the first and second compressors 12, 14. The one or more sensors may also be disposed along the suction lines 42 and the discharge lines 48 of the first compressors 12 and the suction lines 86, the discharge lines 80 and the vapor inlet lines 180 of the second compressors 14. The one or more sensors can communicate data to the control module 210. Based on the data received from the one or more sensors, the control module 210 can open and close the expansion devices, 18, 190, 192, 200, 204 and the bypass valve 196, and control operation of the first and second compressors 12, 14.

One of the benefits of the climate-control system 10 of the present disclosure is that the working fluid discharged from the first compressors 12 may be directed to the intermediate pockets 146, 148, 150, 152 of the compression mechanisms 56 of the second compressors 14 as opposed to mixing with the working fluid in the first fluid passageway 188 prior to the working fluid in the first fluid passageway 188 entering into the second compressors 14 (via the suction lines 86). This improves system efficiency (e.g., by providing extra output or capacity of the compressors 14 and gaining system capacity through cooling of the working fluid in the intermediate pockets 146, 148, 150, 152 of the second compressors 14) while at the same time avoiding having to size the suction lines 86 to account for the flow of the compressed working fluid exiting the first compressors 12.

Figure 4:
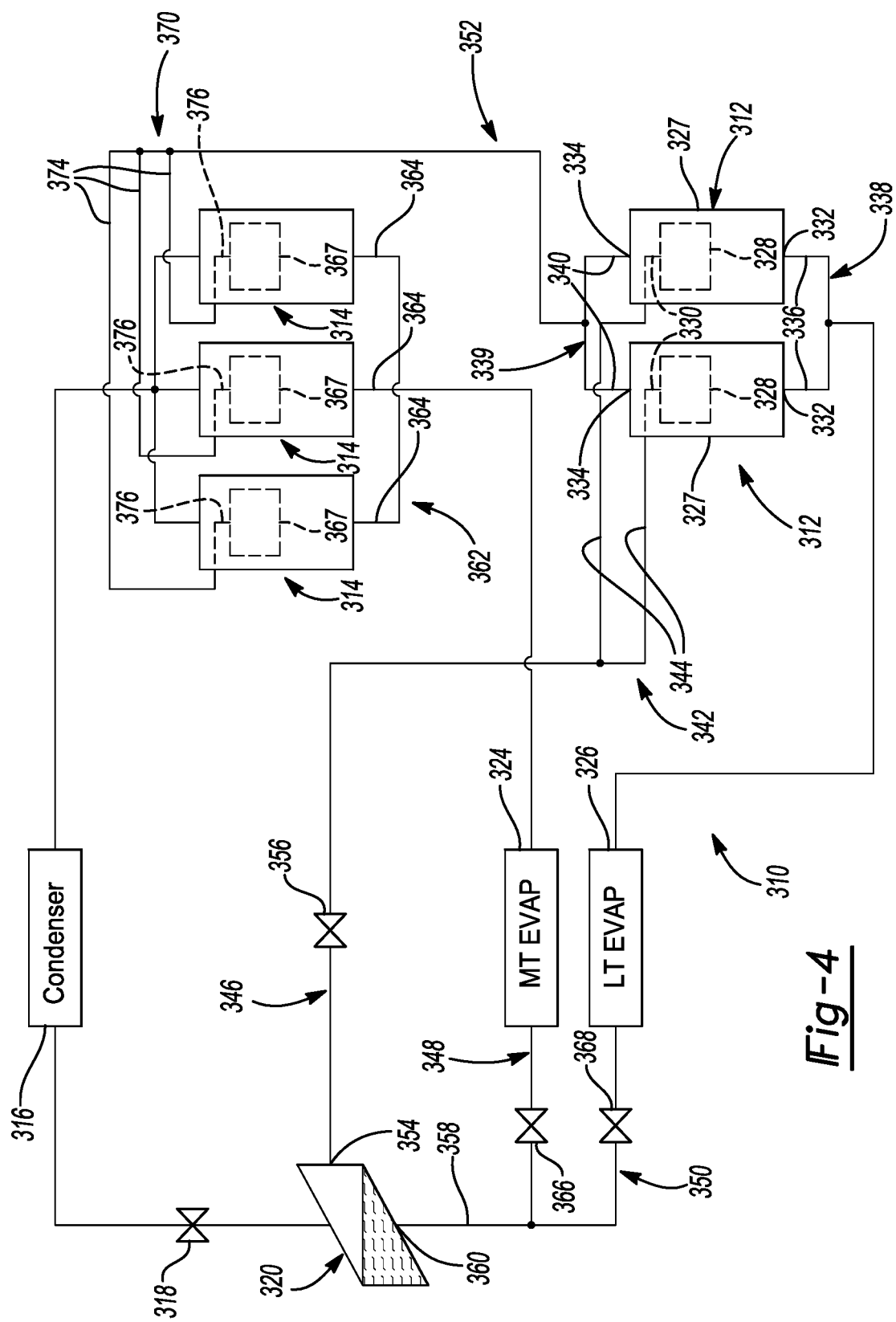
FIG. 4 is a schematic representation of another climate-control system according to the principles of the present disclosure.

With reference to FIG. 4, another climate-control system 310 is provided that may be generally similar to the climate-control system 10 described above, apart from any exception noted below. The climate-control system 310 may include a fluid circuit having first compressors 312, second compressors 314, a first heat exchanger 316 (an outdoor heat exchanger such as a condenser or gas cooler, for example), a first expansion device 318, a flash tank (or second heat exchanger) 320, a third heat exchanger 324 (an indoor heat exchanger such as a medium-temperature evaporator, for example) and a fourth heat exchanger 326 (an indoor heat exchanger such as a low-temperature evaporator, for example). The structure and function of the second compressors 314, the first heat exchanger 316, the flash tank 320, the third heat exchanger 324, the fourth heat exchanger 326 and the control module (not shown) may be similar or identical to that of the second compressors 14, the first heat exchanger 16, the flash tank 20, the fourth heat exchanger 24, the fifth heat exchanger 26 and the control module 210, respectively, described above, and therefore, will not be described again in detail.

Each first compressor 312 may include a shell 327, a compression mechanism 328 and a vapor-injection conduit 330 (e.g., a vapor-injection inlet). The compression mechanism 328 may be disposed within the shell 327 having an inlet 332 (e.g., a first inlet fitting) and an outlet 334 (e.g., an outlet fitting). The inlet 332 may provide fluid to a suction inlet (not shown) of the compression mechanism 328 (e.g., a radially outermost pocket of a scroll compression mechanism). Suction lines 336 may be fluidly coupled to a first header 338 and corresponding inlets 332 of the first compressors 312. In this manner, working fluid exiting the fourth heat exchanger 326 may flow into the first header 338 where it is distributed to the suction lines 336 and the inlets 332 of the first compressors 312 to be compressed by the compression mechanisms 328 of the first compressors 312. After the working fluid is compressed by the compression mechanisms 328 of the first compressors 312, the working fluid can be discharged from the first compressors 312 through the outlets 334 to a second header 339 via discharge lines 340.

The vapor-injection conduit 330 may be at least partially disposed within the shell 327 and may be attached to the shell 327 at an opening thereof. The vapor-injection conduit 330 may include a first end in fluid communication with intermediate pockets of the compression mechanism 328 and a second end in fluid communication with a third header 342 (via a vapor inlet line 344).

The climate-control system 310 may also include a first fluid passageway 346, a second fluid passageway 348, a third fluid passageway 350 and a fourth fluid passageway 352. The first fluid passageway 346 may extend from a vapor outlet 354 of the flash tank 320 to the third header 342 and may include a second expansion device 356 (e.g., an expansion valve or capillary tube). Vapor working fluid in the first fluid passageway 346 flows through the second expansion device 356 where its temperature and pressure is lowered. The vapor working fluid then flows through the third header 342 where it is distributed to the vapor inlet lines 344 and into the intermediate pockets of the compression mechanisms 328 of the first compressors 312 (via the vapor-injection conduits 330).

The second fluid passageway 348 extends from a liquid conduit 358 (that is fluidly coupled to a liquid outlet 360 of the flash tank 320) to a fourth header 362 that is in fluid communication with the second compressors 314 via suction lines 364. The second fluid passageway 348 includes a third expansion device 366 (e.g., an expansion valve or capillary tube) and the third heat exchanger 324. A portion of the working fluid flowing through the liquid conduit 358 flows through the third expansion device 366 of the second fluid passageway 348 where its temperature and pressure is lowered. In the third heat exchanger 324, the working fluid may absorb heat from a first space to be cooled (e.g., an interior of a refrigerator, a refrigerated display case, or a cooler). From the third heat exchanger 324, the working fluid flows to the fourth header 362 where it is distributed to the suction lines 364 and the second compressors 314 to be compressed by compression mechanisms 367 of the second compressors 314.

The third fluid passageway 350 extends from the liquid conduit 358 to the first header 338 that is in fluid communication with the inlet 332 of the first compressors 312 via the suction lines 336. The third fluid passageway 350 includes a fourth expansion device 368 and the fourth heat exchanger 326. Another portion of the working fluid flowing through the liquid conduit 358 flows through the fourth expansion device 368 of the third fluid passageway 350 where its temperature and pressure is lowered. In the fourth heat exchanger 326, the working fluid may absorb heat from a second space to be cooled (e.g., freezer or a frozen food display case). In some configurations, the working fluid in the third heat exchanger 324 of the second fluid passageway 348 and the working fluid in the fourth heat exchanger 326 of the third fluid passageway 350 may absorb heat from the same space (e.g., the third heat exchanger 324 of the second fluid passageway 348 and the fourth heat exchanger 326 of the third fluid passageway 350 may operate at different times to switch the space between a freezer and a cooler, for example). From the fourth heat exchanger 326, the working fluid may flow into the first header 338 where it is distributed to the suction lines 336 and the inlets 332 of the first compressors 312 to be compressed by the compression mechanisms 328 of the first compressors 312.

The fourth fluid passageway 352 extends from the second header 339 to a fifth header 370. The working fluid discharged from the first compressors 312 flows through the fourth fluid passageway 352 (via the discharge lines 340) and into the fifth header 370 where it is distributed to intermediate pockets of the compression mechanisms 367 of the second compressors 314 (via vapor inlet lines 374 and vapor conduits 376).

One of the benefits of the climate-control system 310 of the present disclosure is that the working fluid discharged from the first compressors 312 may be directed to the intermediate pockets of the compression mechanisms 367 of the second compressors 314 as oppose to mixing with the working fluid in the second fluid passageway 348 prior to the working fluid in the second fluid passageway 348 entering into the second compressors 314 (via the suction lines 364). This improves system efficiency (e.g., by providing extra output or capacity of the compressors 314 and gaining system capacity through cooling of the working fluid in the intermediate pockets of the second compressors 314) while at the same time avoiding having to size the suction lines 364 to account for the flow of the compressed working fluid exiting the first compressors 312.

Another benefit of the climate-control system 310 of the present disclosure is that the working fluid exiting the vapor outlet 354 of the flash tank 320 may be directed to the intermediate pockets of the compression mechanisms 328 of the first compressors 312, thereby improving system efficiency (e.g., by providing extra output or capacity of the first compressors 312 and gaining system capacity through cooling of the working fluid in the intermediate pockets of the first compressors 312).

Figure 5:
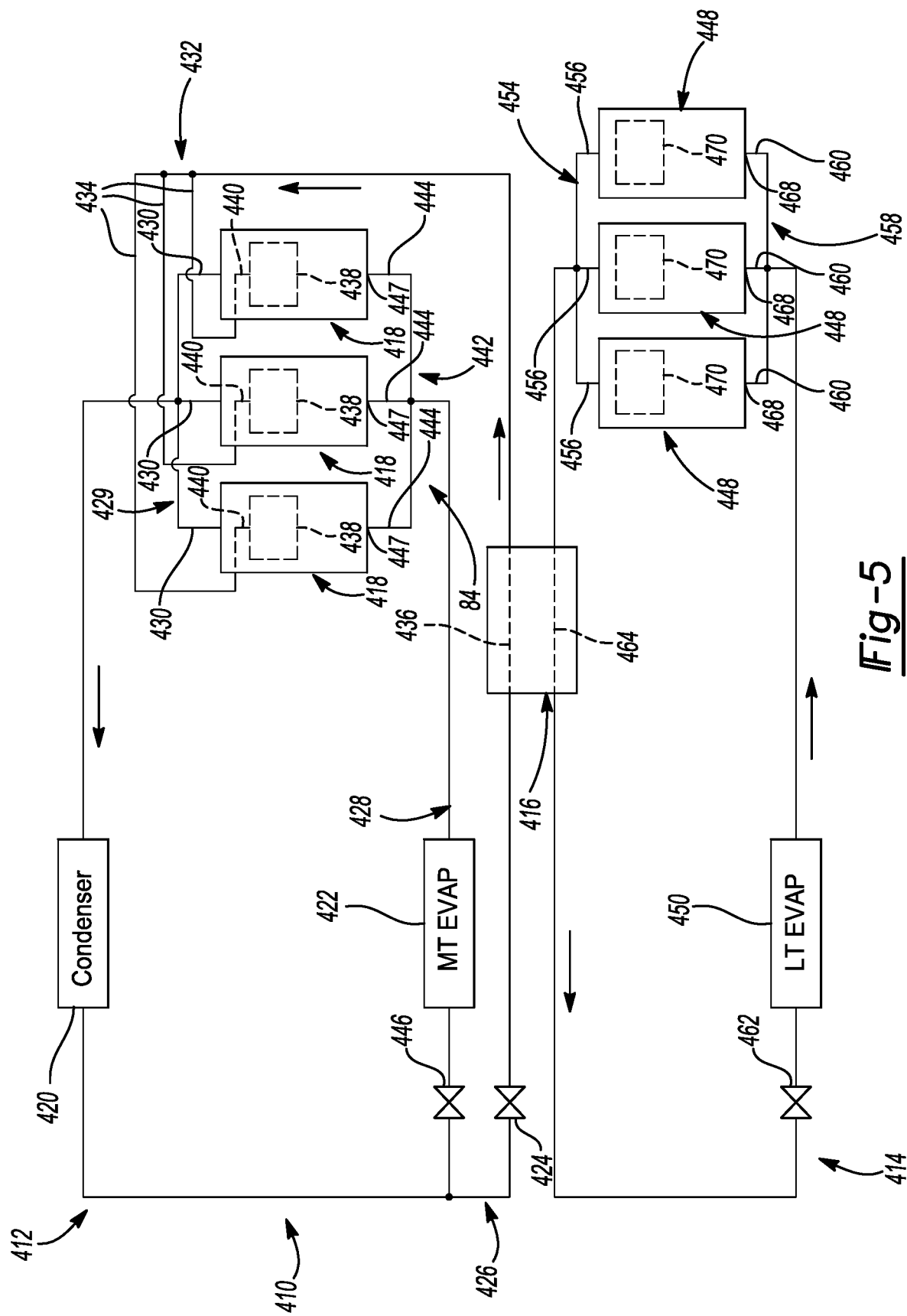
FIG. 5 is a schematic representation of another climate-control system according to the principles of the present disclosure.

With reference to FIG. 5, another climate-control system 410 is provided that may be generally similar to the climate-control systems 10, 310 described above, apart from any exception noted below. The climate-control system 410 may include a first working-fluid circuit 412, a second working-fluid circuit 414 and a first heat exchanger 416. The first working-fluid circuit 412 and the second working-fluid circuit 414 may be in a heat transfer relationship (i.e., thermally coupled) with each other. The first working-fluid circuit 412 and the second working-fluid circuit 414 may also be fluidly isolated from each other.

The first working-fluid circuit 412 may include first compressors 418, a second heat exchanger 420, a third heat exchanger 422 and a first expansion device 424. The structure and function of the first compressors 418 may be similar or identical to that of the second compressors 14, 314 described above, and therefore, will not be described again in detail. The structure and function of the second heat exchanger 420 may be similar or identical to that of the first heat exchangers 16, 316 described above, and therefore, will not be described again in detail. The structure and function of the third heat exchanger 422 may be similar or identical to that of the heat exchangers 24, 324 described above, and therefore, will not be described again in detail. The structure and function of the first expansion device 424 may be similar or identical to that of the expansion devices 18, 318 described above, and therefore, will not be described again in detail.

The first working-fluid circuit 412 may also include a first fluid passageway 426 and a second fluid passageway 428. The first fluid passageway 426 extends from a first header 429 (that is in fluid communication with the first compressors 418 via discharge lines 430) to a second header 432 (that is in fluid communication with the first compressors 418 via vapor inlet lines 434). The first fluid passageway 426 includes the second heat exchanger 420, the first expansion device 424 and a conduit 436 of the first heat exchanger 416. The first header 429 may receive compressed first working fluid (e.g., R134a) from the discharge lines 430 and may direct the compressed first working fluid to the second heat exchanger 420. The second heat exchanger 420 may transfer heat from the compressed first working fluid to ambient air that may be forced over the second heat exchanger 420 by a fan (not shown). In some configurations, the second heat exchanger 420 may transfer heat from the compressed first working fluid to a stream of liquid such as water, for example. From the second heat exchanger 420, the first working fluid may flow through the first expansion device 424 where its temperature and pressure is lowered. The first working fluid then flows through the conduit 436 of the first heat exchanger 416 and to the second header 432 where the first working fluid is distributed to intermediate pockets of the compression mechanisms 438 of the first compressors 418 (via the vapor inlet lines 434 and vapor-injection conduits 440).

The second fluid passageway 428 extends from the first fluid passageway 426 at a location between the second heat exchanger 420 and the first expansion device 424 and to a third header 442 (that is in fluid communication with the first compressors 418 via suction lines 444). The second fluid passageway 428 includes a second expansion device 446 (e.g., an expansion valve or capillary tube) and the third heat exchanger 422. A portion of the first working fluid downstream of the second heat exchanger 420 of the first fluid passageway 426 flows through the second expansion device 446 of the second fluid passageway 428 where its temperature and pressure is lowered. In the third heat exchanger 422, the first working fluid may absorb heat from a first space to be cooled (e.g., an interior of a refrigerator, a refrigerated display case, or a cooler). From the third heat exchanger 422, the first working fluid flows to the third header 442 where the first working fluid is distributed to the suction lines 444 and inlets 447 of the first compressors 418 to be compressed by the compression mechanisms 438 of the first compressors 418.

The second working-fluid circuit 414 includes second compressors 448 and a fourth heat exchanger 450. The structure and function of the second compressors 448 may be similar or identical to that of compressors 12 described above, and therefore, will not be described again in detail. The structure and function of the fourth heat exchanger 450 may be similar or identical to that of heat exchangers 26, 326 described above, and therefore, will not be described again in detail.

The second working-fluid circuit 414 also includes a third expansion device 462 and a conduit 464 of the first heat exchanger 416. A fourth header 454 (that is in fluid communication with the second compressors 448 via discharge lines 456) may receive a compressed second working fluid (e.g., carbon dioxide) from the discharge lines 456 and may direct the compressed second working fluid to the conduit 464 of the first heat exchanger 416 where the second working fluid transfers heat to the first working fluid in the conduit 436. The second working fluid then flows through the third expansion device 462 where its temperature and pressure is lowered. In the fourth heat exchanger 450, the second working fluid may absorb heat from a second space to be cooled (e.g., freezer or a frozen food display case). From the fourth heat exchanger 450, the second working fluid flows to a fifth header 458 where the second working fluid is distributed to suction lines 460 and inlets 468 the second compressors 448 to be compressed by the compression mechanisms 470 of the second compressors 448.

One of the benefits of the climate-control system 410 of the present disclosure is that the first working fluid flowing through the conduit 436 of the first heat exchanger 416 may absorb heat from the second working-fluid circuit 414 prior to entering the intermediate pockets of the compression mechanisms 438 of the first compressors 418 (via the vapor inlet lines 434 and vapor-injection conduits 440). This improves system efficiency (e.g., by providing extra output or capacity of the first compressors 418 and gaining system capacity through cooling of the working fluid in the intermediate pockets of the first compressors 418).

Figure 6:
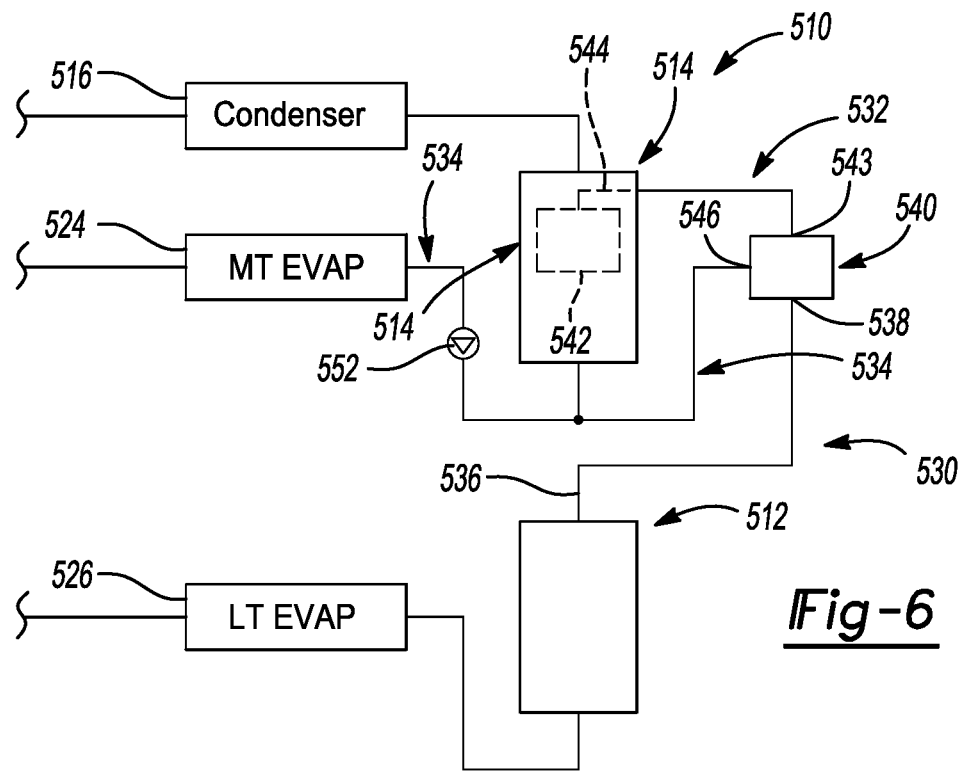
FIG. 6 is a schematic representation of a portion of another climate-control system according to the principles of the present disclosure.

With reference to FIG. 6, another climate-control system 510 is provided that may be generally similar to the climate-control systems 10, 310, 410 described above, apart from any exception noted below. The climate-control system 510 may include a fluid-circuit having a first compressor 512, a second compressor 514, a first heat exchanger 516, a second heat exchanger 524 and a third heat exchanger 526. The structure and function of the first compressor 512 may be similar or identical to that of the compressors 12, 448 described above, and therefore, will not be described again in detail. The structure and function of the second compressor 514 may be similar or identical to that of compressors 14, 314, 418 described above, and therefore, will not be described again in detail. The structure and function of the first heat exchanger 516 may be similar or identical to that of heat exchangers 16, 316, 420 described above, and therefore, will not be described again in detail. The structure and function of the second heat exchanger 524 may be similar or identical to that of heat exchangers 24, 324, 422 described above, and therefore, will not be described again in detail. The structure and function of the third heat exchanger 526 may be similar or identical to that of heat exchangers 26, 326, 450 described above, and therefore, will not be described again in detail.

The climate-control system 510 also includes a first fluid passageway 530, a vapor inlet line 532 and a second fluid passageway 534. The first fluid passageway 530 extends from a discharge line 536 of the first compressor 512 to an inlet 538 of a 3-way valve 540. The vapor inlet line 532 extends from a first outlet 543 of the 3-way valve 540 to intermediate pockets of a compression mechanism 542 of the second compressor 514 (via a vapor-injection conduit 544). The second fluid passageway 534 extends from a second outlet 546 of the 3-way valve 540 to a suction line 548 of the second compressor 514.

Compressed working fluid discharged from the first compressor 512 may flow to the inlet 538 of the 3-way valve 540. If the climate-control system 510 does not have a medium temperature load (i.e., the climate-control system 510 does not require the second heat exchanger 524 to absorb heat from a space to be cooled), for example, the working fluid flowing through the 3-way valve 540 is directed out the second outlet 546 of the 3-way valve 540 to the suction line 548 of the second compressor 514 to be compressed by the compression mechanism 542 of the second compressor 514. In this way, the second compressor 514 acts as a second-stage pump, for example, to circulate the working fluid through the fluid-circuit of the climate-control system 510. A check valve 552 may be disposed along a third fluid passageway 554 extending from the second heat exchanger 524 to the suction line 548 to prevent back-flow into the second heat exchanger 524.

If the climate-control system 510 does have a medium temperature load (e.g., the climate-control system 510 requires the second heat exchanger 524 to absorb heat from the space to be cooled), the working fluid flowing through the inlet 538 of the 3-way valve 540 is directed out the first outlet 543 of the 3-way valve 540 to the vapor inlet line 532 where it flows to intermediate pockets of the compression mechanism 542 of the second compressor 514 (via the vapor-injection conduit 544).

One of the benefits of the climate-control system 510 of the present disclosure is that the compressed working fluid discharged from the first compressor 512 may flow to the suction line 548 of the second compressor 514 or the intermediate pockets of the compression mechanism 542 of the second compressor 514 based at least partially on the operating conditions of the climate-control system 510. In this way, the efficiency of the climate-control system 510 may be optimized. It is understood that the climate-control systems 10, 310, 410 described above may be modified to incorporate the climate-control system 510 thereto.

Figure 7:
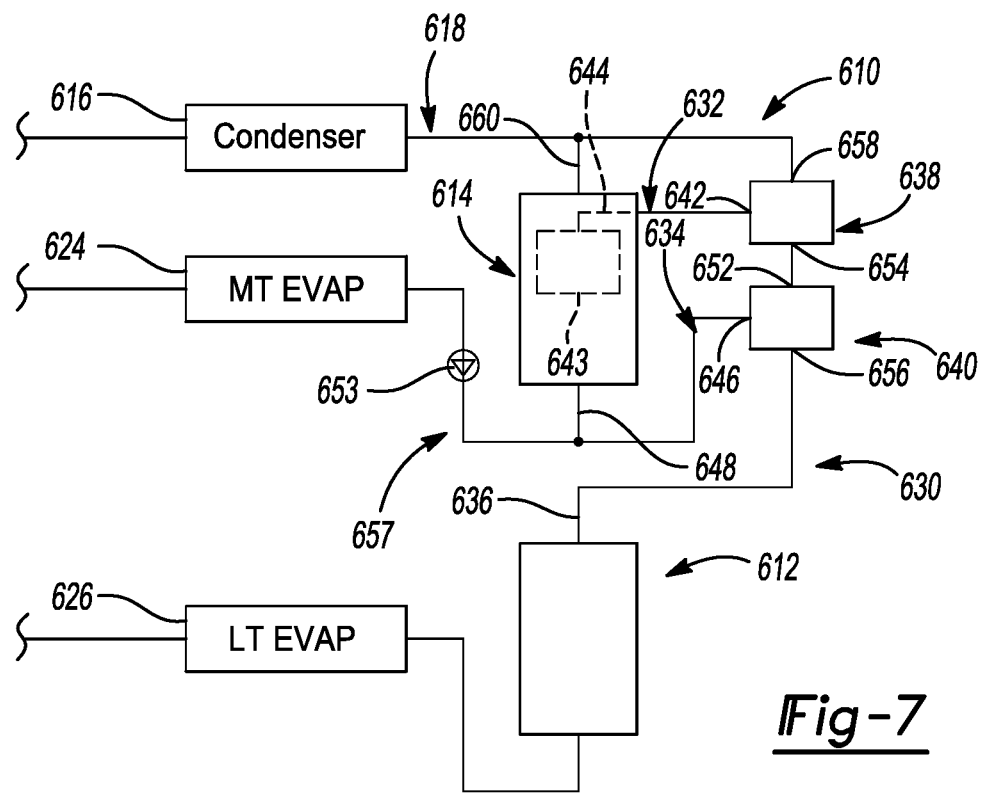
FIG. 7 is a schematic representation of a portion of another climate-control system according to the principles of the present disclosure.

With reference to FIG. 7, another climate-control system 610 is provided that may be generally similar to the climate-control systems 10, 310, 410, 510 described above, apart from any exception noted below. The climate-control system 610 may have a fluid-circuit having a first compressor 612, a second compressor 614, a first heat exchanger 616, a second heat exchanger 624 and a third heat exchanger 626. The structure and function of the first compressor 612 may be similar or identical to that of the compressors 12, 448, 512 described above, and therefore, will not be described again in detail. The structure and function of the second compressor 614 may be similar or identical to that of compressors 14, 314, 418, 514 described above, and therefore, will not be described again in detail. The structure and function of the first heat exchanger 616 may be similar or identical to that of heat exchangers 16, 316, 420, 516 described above, and therefore, will not be described again in detail. The structure and function of the second heat exchanger 624 may be similar or identical to that of heat exchangers 24, 324, 422, 524 described above, and therefore, will not be described again in detail. The structure and function of the third heat exchanger 626 may be similar or identical to that of heat exchangers 26, 326, 450, 526 described above, and therefore, will not be described again in detail.

The climate-control system 610 may also include a first fluid passageway 630, a vapor inlet line 632 and a second fluid passageway 634. The first fluid passageway 630 extends from a discharge line 636 of the first compressor 612 to a third fluid passageway 618 (that extends from a discharge line 660 of the second compressor 614 and includes the first heat exchanger 614). The first fluid passageway 630 may include first and second 3-way valves 638, 640. The vapor inlet line 632 extends from a first outlet 642 of the first 3-way valve 638 to intermediate pockets of a compression mechanism 643 of the second compressor 614 (via a vapor-injection conduit 644). The second fluid passageway 634 extends from a first outlet 646 of the second 3-way valve 640 to a suction line 648 of the second compressor 614.

Compressed working fluid discharged from the first compressor 612 may flow to an inlet 656 of the second 3-way valve 640. If the climate-control system 610 does not have a medium-temperature load (e.g., the climate-control system 610 does not require the second heat exchanger 624 to absorb heat from a space to be cooled), the working fluid flowing through the inlet 656 of the second 3-way valve 640 is directed out the first outlet 646 of the second 3-way valve 640 to the suction line 648 of the second compressor 614 to be compressed by the compression mechanism 643 of the second compressor 614. In this way, the second compressor 614 may act as a second-stage pump, for example, to circulate the working fluid through the fluid-circuit of the climate-control system 610. A check valve 653 may be disposed along a fourth fluid passageway 657 extending from the second heat exchanger 624 to the suction line 648 to prevent back-flow into the second heat exchanger 624.

If the climate-control system 610 does have a medium temperature load (e.g., the climate-control system 610 requires the second heat exchanger 624 to absorb heat from the space to be cooled), the working fluid flowing through the inlet 656 of the second 3-way valve 640 is directed out a second outlet 652 of the second 3-way valve 640 and into an inlet 654 of the first 3-way valve 638. The working fluid may then be directed out the first outlet 642 of the first 3-way valve 638 to the vapor inlet line 632 where it flows to intermediate pockets of the compression mechanism 643 of the second compressor 614 (via the vapor-injection conduit 644).

In some configurations, the climate-control system 610 may not have a medium-temperature load, for example, and the second compressor 614 of the climate-control system 610 may be shut-off, therefore, not being used as a second-stage pump, for example, to circulate the working fluid through the fluid-circuit. In this way, the compressed working fluid discharged from the first compressor 612 may bypass the second compressor 614. That is, the compressed working fluid discharged from the first compressor 612 may flow to the second 3-way valve 640 where it is directed out the second outlet 652 of the second 3-way valve 640 and into the inlet 654 of the first 3-way valve 638. The working fluid may then be directed to a second outlet 658 of the first 3-way valve 638 where it may flow to the first heat exchanger 616 (via the third fluid passageway 618).

One of the benefits of the climate-control system 610 of the present disclosure is that the compressed working fluid discharged from the first compressor 612 may flow to the suction line 648 of the second compressor 614 or the intermediate pockets of the compression mechanism 643 of the second compressor 614 based at least partially on the operating conditions of the climate-control system 610. Another benefit of the climate-control system 610 of the present disclosure is that the working fluid may bypass the second compressor 614 based at least partially on the operating conditions of the climate-control system 610. In this way, the efficiency of the climate-control system 610 may be optimized. It is understood that the climate-control systems 10, 310, 410, 510 described above may be modified to incorporate the climate-control system 610 thereto.

In this application, the term "module" or "control module" may be replaced with the term circuit. The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112 (f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate-control system comprising:
a first compressor having a first inlet and a first outlet;
a second compressor in fluid communication with the first compressor and having second and third inlets, a second compression mechanism and a second outlet, the second and third inlets fluidly coupled to the second compression mechanism, the second compression mechanism is configured to receive working fluid from the first compressor through the third inlet and is configured to discharge working fluid through the second outlet of the second compressor,
wherein a first heat exchanger is in fluid communication with the second compressor and is configured to receive working fluid from the second compressor,
wherein a second heat exchanger is in fluid communication with the first heat exchanger and includes a fourth inlet and third and fourth outlets, the fourth inlet is configured to receive working fluid from the first heat exchanger, the third outlet is configured to provide working fluid to the first inlet,
wherein a first expansion device is disposed between the first heat exchanger and the second heat exchanger,
wherein the fourth outlet of the second heat exchanger is configured to provide working fluid to the second inlet of the second compressor, and
wherein the climate-control system further comprises a third heat exchanger disposed between the first and second compressors and including a fifth inlet, a fifth outlet configured to provide working fluid to the second inlet of the second compressor, and a sixth outlet configured to provide working fluid to the third inlet of the second compressor.

2. The climate-control system of claim 1, further comprising a first fluid passageway extending from the fourth outlet of the second heat exchanger through the third heat exchanger and configured to provide working fluid to the second inlet of the second compressor.

3. The climate-control system of claim 2, further comprising second and third expansion devices, wherein the second expansion device is disposed along the first fluid passageway at a location upstream of the third heat exchanger, and wherein the third expansion device is disposed along the first fluid passageway at a location downstream of the third heat exchanger.

4. The climate-control system of claim 3, further comprising a second fluid passageway extending from a liquid conduit to the first fluid passageway, wherein the liquid conduit is fluidly coupled to the third outlet of the second heat exchanger.

5. The climate-control system of claim 4, wherein the second fluid passageway includes a fourth heat exchanger and a fourth expansion device.

6. The climate-control system of claim 5, further comprising a third fluid passageway extending from the liquid conduit fluidly coupled to the third outlet of the second heat exchanger and configured to provide working fluid from the liquid conduit to the first inlet of the first compressor.

7. The climate-control system of claim 6, wherein the third fluid passageway includes a fifth heat exchanger and a fifth expansion device.

8. The climate-control system of claim 7, wherein the fourth heat exchanger and the fifth heat exchanger are evaporators.

9. The climate-control system of claim 2, further comprising a bypass passageway extending from the first fluid passageway at a location upstream of the third heat exchanger to the first fluid passageway at a location downstream of the third heat exchanger, wherein the bypass passageway bypasses the third heat exchanger.

10. The climate-control system of claim 1, wherein the second heat exchanger is a flash tank, and wherein the third outlet is a liquid outlet and the fourth outlet is a vapor outlet.

11. The climate-control system of claim 1, further comprising a first fluid passageway configured to provide working fluid from the first outlet of the first compressor to the third inlet of the second compressor.

12. The climate-control system of claim 1, wherein the third inlet is a vapor-injection conduit.

13. The climate-control system of claim 1, wherein the third heat exchanger includes a first conduit and a second conduit, wherein the first and second conduits are in a heat transfer relationship with each other, wherein the first conduit includes the fifth inlet and the fifth outlet, and wherein the second conduit includes the sixth outlet and a sixth inlet of the third heat exchanger.

* * * * *